June 11, 1968

J. D. BOLESKY

SNAP ACTING THERMAL DISC WITH BENT-OVER ANGULATED LEAF SPRING CONTACT MEMBER

Original Filed Oct. 21, 1964

Re. 26,406

INVENTOR.
JOHN D. BOLESKY

BY Mc Coy, Greene, Medert & Te Grotenhuis

ATTORNEYS

United States Patent Office

Re. 26,406
Reissued June 11, 1968

26,406

SNAP ACTING THERMAL DISC WITH BENT-OVER ANGULATED LEAF SPRING CONTACT MEMBER

John D. Bolesky, Mansfield, Ohio, assignor to Therm-O-Disc, Incorporated, Mansfield, Ohio, a corporation of Ohio Original No. 3,317,693, dated May 2, 1967, Ser. No. 405,416, Oct. 21, 1964. Application for reissue Nov. 9, 1967, Ser. No. 685,997
11 Claims. (Cl. 337—343)

Matter enclosed in heavy brackets [ ] appears in the original patent but forms no part of this reissue specification; matter printed in italics indicates the additions made by reissue.

*ABSTRACT OF THE DISCLOSURE*

*A bimetallic disc operated thermostat is disclosed which includes a body formed with switch cavities. A fixed contact is mounted on one side location of the switch cavity and a mobile contact is mounted on a diametrically opposite side location. The mobile contact includes a portion extending along the bottom wall of the cavity to a location adjacent the side wall substantially midway between the two mounting locations, and a cantilever arm extending substantially the entire distance across the cavity joined to the mounting portion at a reverse bend. The fixed contact includes a portion extending from its mounting to a location overlying the free end of the cantilever arm. The mobile contact is formed with a fold which operates to maintain engagement between the bottom wall of the cavity and the mobile contact adjacent to the reverse bend.*

This invention relates to a thermostatic control and more particularly to a new and improved thermostatic control for use on small appliances having increased current carrying capacity.

Heretofore, in small thermostatic control designed to carry relatively high currents, it has been the practice to employ a mobile bridging current carrying member between two widely separated stationary contacts. Although satisfactory from a current carrying standpoint, such thermostatic controls were subject to contact contamination which was greatly enhanced due to the presence of two contact breaks.

The alternative was to furnish a control embodying a single contact break by providing a cantilevered arm on the end of which was mounted a mobile contact which would make or break contact with a stationary contact in response to the movements of the arm. The use of such structure was confined to relatively large devices by reason of the fact that the arm required to carry the desired current was too heavy to bend or flex within the confines of a small sized control. Accordingly, such attempts have, until now, been only partially successful, for there existed problems in adequately securing the fixed end of the cantilevered arm and by the inability of the arm to bend enough in response to a small force to separate the contacts with a snap action.

In the present invention the cantilevered arm is formed by bending a strip of metal with an offset portion, securing the end of the offset portion in a suitable housing, and mounting on the free end of the arm the mobile contact member. The offset portion in the strip serves to position the fixed end of the cantilever arm, or the bend in the strip, closely adjacent the inside wall of the housing. This arrangement has the advantage that maximum deflection of the free end of the cantilever arm is obtained by applying a force along the arm at a specified distance from the inner wall of the housing nearest the fixed end of the arm. The force required in the device of the present invention is substantially reduced to effect operation of the switch elements over that used in previous devices. Thus, the arm will be responsive to a more sensitive temperature sensing device.

It is among the objects of this invention to provide a relatively small thermostatic control of high current carrying capacity employing a cantilevered contact carrying arm which is so mounted as to obtain the maximum deflection with the minimum amount of applied force.

It is a further object of this invention to provide a small thermostatic control of relatively high current carrying capacity employing a single contact break and thus minimizing failure in operation due to contact contamination.

These and other objects and advantageous features of the present invention will become apparent from the following detailed description of a preferred embodiment thereof, taken in conjunction with the accompanying drawings wherein corresponding reference characters denote corresponding parts and wherein.

Figure 1:
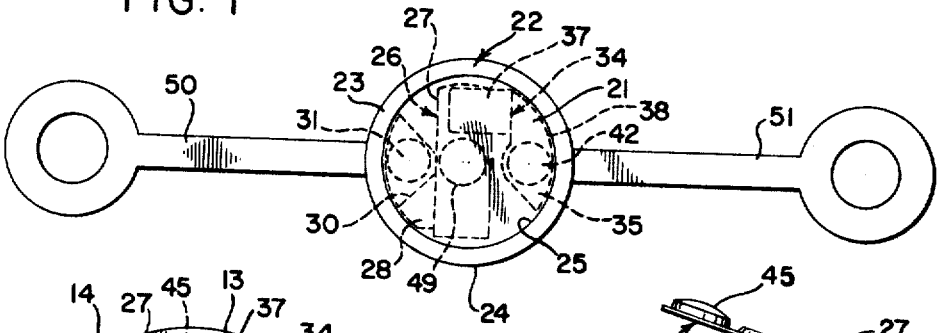
FIGURE 1 is a top plan view of a thermostatic control embodying the present invention.

With reference to the accompanying drawings, there is illustrated a thermostatically controlled device embodying a switch for controlling an electrical circuit made in accordance with the teachings of the present invention and comprising a substantially cyclindrical housing 10 having a bottom wall 11 and an upstanding side wall 12 extending therefrom, made preferably of an electrical insulating material which is heat resistant to a fair degree, such as a phenolic condensation product. Adjacent to its upper extremity the side wall 12 is provided with an outwardly extended flange 13 forming a peripheral surface 14. The housing 10 defines a switch cavity designated by the numeral 15. The upper surface of the bottom wall 11 serving as the bottom of the switch cavity 15 is formed with a semi-circular recess 16.

A separate end wall member 17 of suitable insulating material extends across the upper open end of the cavity 15 providing an arc shield or closure for the open end of the switch cavity 15. The end wall member 17 is substantially disc-like in contour and is provided with an inwardly extending peripheral recess defining a horizontal wall 18 and a vertical wall 19. The portion of the end wall 17 defined by the vertical wall 19 seats within the cavity 15 and the horizontal wall 18 seats upon the upper end surface of the side wall 12. Formed in the top surface of the closure of end wall member 17 is a recess 20, the peripheral edge of which is offset to form a seat for the reception of bimetallic disc member 21.

Figure 3:
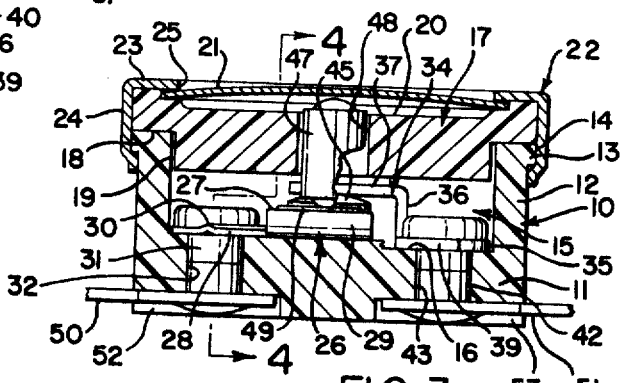
FIGURE 3 is a longitudinal sectional view taken on the line 3—3 of FIGURE 2, illustrating the elements of the device in closed circuit position.
Figure 4:
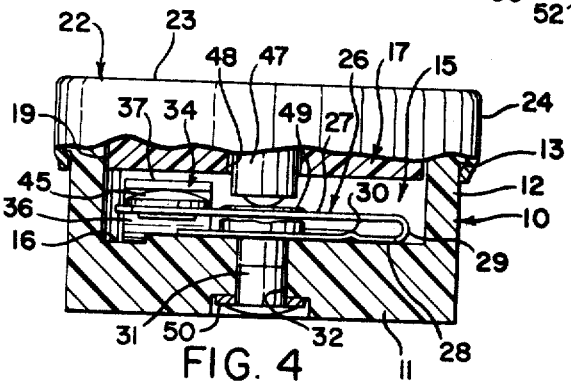
FIGURE 4 is a transverse sectional view taken on the line 4—4 of FIGURE 3.

A cup shaped metallic cover member 22 having a horizontal top wall 23 and a downwardly extending vertical side wall 24 encompasses the upper portion of end wall member 17 and serves to maintain the disc and end wall assembled on the open end of the housing 10. A circular opening 25 having a diameter approximately equal to that of the recess 20 of the end wall member 17 below is formed in the top wall 23 to permit the free movement of the disc member between opposite positions of concavity. The lower surface of the top wall 23 surrounding the opening 25 bears against the upper surface of the bimetallic disc 21, maintaining the same seated on the peripheral edge of the recess 20. The lower portion of the side wall 24 is depressed inwardly under the flange 13 and against the outer surface of the side wall 12 so as to fasten the cover member 22 securely to the housing 10, as shown in FIGURE 3.

Figure 5:
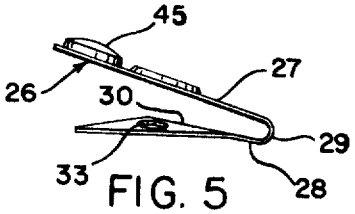
FIGURE 5 is a side elevational detail view of the metal strip which has been bent to form a cantilever arm upon which is mounted the mobile contact.
Figure 6:
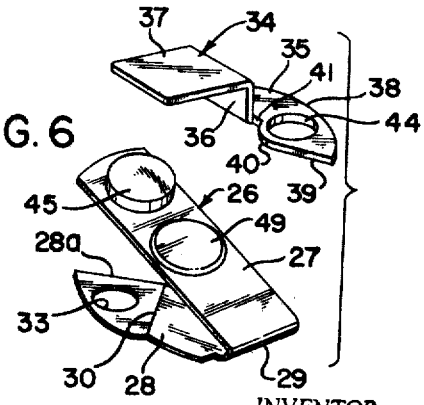
FIGURE 6 is a perspective view of the elements of the switch contained in the device.
Figure 7:
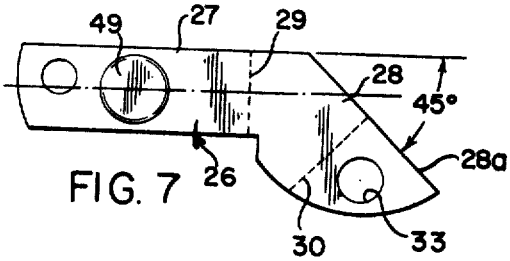
FIGURE 7 is a top plan view of the blank from which the mobile contact carrying arm of the switch is formed.

Mounted in the cavity 15 of the housing are the switch elements of the device comprising a mobile contact carried by a cantilever mounted arm and a fixed contact. A strip 26 of suitable, electrically conducting metal, shown in the form of a blank in FIGURE 7, consists of two segments 27 and 28. The side 28a of segment 28 departs from the direction of the parallel sides of segment 27 by an angle shown in FIGURE 7 as 45°. The cantilever arm carrying the mobile contact is thus formed by bending the two segments of strip 26 about a fold line 29, as shown in FIGURE 7, to form the contact carrying arm 27 and anchoring segment 28. The strip 26 in its bent or folded position is shown in FIGURES 5 and 6, the arm 27 and segment 28 being folded through an angle less than 180°. The segment 28 is folded slightly about line 30, for a purpose which will be made clear hereinafter. The remaining perimeter of segment 28, as shown in FIGURE 7, consists of a circular arc whose radius is equal to or only slightly smaller than that of the switch cavity 15 and which ends at a short, straight-line portion of the circumference which continues until it meets at right angles the edge of arm 27.

Figure 2:
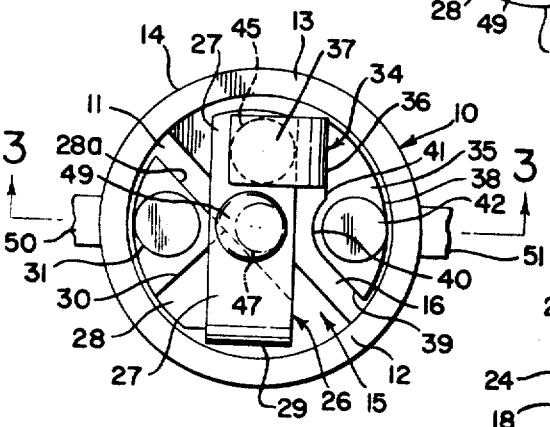
FIGURE 2 is an enlarged top plan view of the device with the thermostatic element and retaining member therefor removed.

The folded metal strip 26 is disposed in the switch cavity 15 and secured in the position shown in FIGURE 2 by terminal post 31 which extends up through appropriate openings 32 and 33 in the bottom wall 11 and anchoring segment 28 respectively.

A stationary contact arm 34, shown in FIGURE 6, consists of a lower horizontal portion 35, and an upwardly extending vertical portion 36 which terminates in a horizontal portion 37, the under surface of which is provided with a contact surface. The perimeter of portion 35 consists partly of a circular arc 38 whose radius is equal to or only slightly smaller than that of the switch cavity 15. At one end of arc 38 a straight-line segment 39 begins, to be joined at its end by circular arc segment 40, having a radius smaller than that of arc 38. The perimeter of portion 35 is completed by a straight-line segment 41 connecting arcs 38 and 40.

The vertical portion 36 of the arm 34 which is rectangular in shape, is bent horizontally at its upper extremity to form the contact engaging portion 37, which is arranged to extend over the mobile contact carrying arm 27.

The stationary contact arm 34 is mounted in the recess 16 formed in the bottom wall of the switch cavity 15 and secured in the position shown in FIGURE 2 by a terminal post 42 extending upwardly through appropriate openings 43 and 44 in the bottom wall 11 and the portion 35, respectively. Opening 44 is concentric with the circular arc 40. In the embodiment shown openings 32 and 43 in which the terminal posts are mounted are diametrically opposite to each other in the switch cavity 15.

With the mobile contact carrying arm 27 and the fixed contact arm 34 thus positioned, as illustrated in FIGURE 2, the upper horizontal contact portion 37 of the stationary contact arm is directly above the contact member 45 mounted on the end of the mobile contact carrying arm 27. As the strip has been folded through an angle of less than 180°, as previously mentioned, the arm 27 is biased upwardly at an angle toward the contact 37, causing the mobile contact 45 normally to be in contact with the lower surface of contact portion 37.

In the operation of the thermostatic control, a bumper member 47, cylindrical in contour, upon the ends of which are formed spherical bearing portions, extends through a suitable opening 48 in the end wall member 17. The lower spherical bearing portion of the bumper 47 engages an elevated surface 49 formed on the arm 27 which surface also serves to stiffen the arm 27 at its central portion and shifts the point of greatest flexing in the arm 27 to the fold 29. When the bimetallic disc 21 is curved so that its upper surface is in one position of concavity, as shown in FIGURE 3, the bumper member 47 is freely slidable within the opening 48. Upon a rise in temperature to a critical point, the disc 21 snaps to its opposite position of concavity, forcing the bumper 47 to engage the arm 27 and pivot the same about the fold line 29, breaking the electrical contacts 45 and 37 and opening the electrical circuit.

The fold of less than 180° which is made in strip 26 along the line 29 is such that the contact carrying arm 27 will support the weight of the bumper 47 and still leave the arm biased sufficiently toward the stationary contact that contact button 45 will bear firmly against the underside of contact 37 when the circuit is in the closed position. The elastic properties of the strip 26, however, are such that when the disc 21 snaps, the contacts 45 and 37 will be separated with a snap action minimizing arcing therebetween. By placing a deviation of 45° from the longitudinal centerline of the segment 28 as shown in FIGURE 7 (an angle which remains after the two segments are folded about line 29), the maximum free space between the arm 27 and the upper surface of bottom wall 11 is obtained, permitting maximum deflection of the arm 27. The slight bend which has been placed in segment 28 along line 30 serves to bias the segment 28 against the bottom surface of the switch cavity and to exert pressure adjacent the fold line 29 when the arm 27 is in position, thereby obtaining uniformity in the assembly of the devices.

Electrical terminal straps 50 and 51 are connected electrically with mobile contact 45 and stationary contact 37, through terminal posts 31 and 42, respectively, as shown in FIGURE 3. The terminal straps 50 and 51 may be of whatever shape, length, width, and thickness desired, but typical members are shown in FIGURE 1.

Appropriate recesses 52 and 53 in the bottom exterior surface of the housing 10 permit the heads of the terminal posts 31 and 42, respectively, to be flush with the surface of the housing, thus providing a flat mounting surface on the control to facilitate its use in appliances.

While there has been described herein and illustrated in the accompanying drawings a presently preferred embodiment of the present invention, it is to be understood that various modifications and refinements which depart from the illustrated embodiment may be adopted without departing from the spirit and scope of the invention.

I claim:

1. A thermostatic control device comprising a hollow cylindrical housing having an open end and a closed end, diametrically opposed terminals projecting through the closed end of said housing into the housing chamber, switch means mounted within the housing chamber including a fixed contact positioned circumferentially between said terminals, a mobile contact mounted on a contact carrying arm extending diametrically from said fixed contact, said mobile contact carrying arm having an offset portion securing the same to one of said terminals, said mobile contact carrying arm having a portion thereof reversely bent along a transverse line and angulated circumferentially from the plane of the arm to one of said terminals and secured thereto, said angulated portion having a fold therein to bias the arm against the closed end wall at said transverse line, and a snap acting thermostatic disc mounted in the open end of said housing and having two positions of stability, said thermostatic disc passing automatically from its first position of stability to its second position upon a rise in temperature of a predetermined degree and in its second position adapted to move said mobile contact member with respect to said fixed contact member.

2. A thermostatic control device comprising a housing defining a switch chamber having a closed end and an open end, switch means mounted within said switch chamber including a fixed contact, and a mobile contact adapted to engage the fixed contact, means for supporting said mobile contact comprising a cantilever mounted arm spanning substantially the diameter of the switch chamber, said arm having an offset portion reversely bent along a transverse line and angulated from the plane of the arm and secured to a terminal post circumferentially spaced therefrom, said angulated portion having a fold therein to bias the arm against the closed end wall at said transverse bend, and means mounted in the open end of said switch chamber including a bimetallic member having two opposite positions of stability and engageable with said cantilever mounted arm in one of said positions to move the mobile contact with respect to the fixed contact.

3. A thermostatic control device comprising a hollow cylindrical housing defining a switch chamber having an open end and a closed end, circumferentially spaced terminal members extending through the closed end of the housing, switch means disposed within said chamber including a fixed contact operatively connected to one of said terminal members, a mobile contact carrying arm connected to the other of said terminal members, said arm having a portion circumferentially offset from said supporting terminal and reversely bent along a transverse line and traversing diametrically the switch chamber between said spaced terminal members and carrying a mobile contact engageable with the said fixed contact, said arm having a fold therein to bias the arm against the closed end wall of the switch chamber at said transverse line, a snap acting thermostatic disc mounted in the open end of said housing and having two positions of stability, said thermostatic disc passing automatically from its first position of stability to its second position upon a rise in temperature of a predetermined degree, said thermostatic disc in its second position arranged to move said mobile contact member with respect to said fixed contact member.

4. A thermostatic control device comprising a hollow cylindrical housing having an open end and a closed end, diametrically opposed terminals projecting through the closed end of said housing into the housing chamber, switch means mounted within the housing chamber including a fixed contact positioned circumferentially between said terminals, a mobile contact mounted on a contact carrying arm extending diametrically from said fixed contact, said mobile contact carrying arm having a portion thereof reversely bent along a transverse line and angulated from the plane of the arm to one of said terminals and secured thereto, said angulated portion having a fold therein to bias the arm against the closed end at said transverse line, a closure member mounted in the open end of said chamber, a snap acting thermostatic disc mounted on the outer surface of said closure member and having two positions of stability, said thermostatic disc passing automatically from its first position of stability to its second position upon a rise in temperature of a predetermined degree, and means carried by said closure member for translating movement of said disc to the mobile contact carrying arm.

5. A thermostatic control device comprising a hollow cylindrical housing defining a switch chamber having an open end and a closed end, circumferentially spaced terminal members extending through the closed end of the housing, switch means disposed within said chamber including a fixed contact, an offset member for operatively connecting said fixed contact to one of said terminals, a mobile contact adapted to engage said fixed contact, a cantilever mounted arm extending diametrically of said switch chamber for supporting said mobile contact, said arm having a portion reversely bent along a transverse line and having an angulated portion which is secured to the other of said terminals, said angulated portion having a fold therein to bias the arm against the closed end at said transverse line, a closure member mounted in the open end of said switch chamber, a snap acting thermostatic plate passing automatically from its first position of stability to its second position upon a rise in temperature of a predetermined degree, and means carried by said closure member for translating movement of said disc to the mobile contact carrying arm.

*6. A thermostatic control device comprising a hollow housing assembly including a housing having a side wall and a base wall cooperating to define a switch chamber having a central axis, switch means in said chamber including a fixed contact means and a mobile contact means, said fixed contact means including a first mounting portion secured to said base wall adjacent to said side wall at a first location, said mobile contact means including a second mounting portion secured to said base wall adjacent to said side wall at a second location diametricall opposite said first location, said fixed contact means extending from its mounting portion to a contact portion at a third location adjacent to said side wall and substantially equally spaced from said first and second locations, said mobile contact means providing a support portion extending from said second location to a fourth location adjacent said side wall and diametrically opposite said third location, said mobile contact means being formed with a bend at said fourth location joining said support portion and a cantilever arm, said cantilever arm extending diametrically between said fourth location and said third location, said cantilever arm providing a mobile contact portion at said third location which is movable into and out of engagement with said fixed contact portion, said fixed contact means being spaced from said second location and said mobile contact means being spaced from said first location, and temperature responsive means mounted on said housing assembly providing movement along said central axis in response to temperature changes, said temperature responsive means being operably connected to said cantilever arm at a location substantially adjacent to said axis to move said moblie contact portion into and out of engagement with said fixed contact portion in response to said movement.*

*7. A thermostatic control device as set forth in claim 6 wherein said fixed contact portion is spaced from said base wall and said mobile contact portion is between said base wall and said fixed contact portion.*

*8. A thermostatic control device as set forth in claim 6 wherein said support portion extends along said base wall.*

*9. A thermostatic control device as set forth in claim 6 wherein said chamber is cylindrical.*

*10. A thermostatic control device as set forth in claim 6 wherein said contact means each include a conductor extending from the associated mounting portion through said base wall to an external terminal.*

*11. A thermostatic control device as set forth in claim 10 wherein each conductor is a fastener operative to mount both the associated mounting portion and associated terminal on said housing.*

(References on following page)

References Cited

The following references, cited by the Examiner, are of record in the patented file of this patent or the original patent.

UNITED STATES PATENTS

| | | | |
|---|---|---|---|
| 502,749 | 8/1893 | Oehring | 200—159 |
| 560,023 | 5/1896 | Day | 200—159 |
| 887,166 | 5/1908 | Wilhelm | 200—159 |
| 1,477,335 | 12/1823 | Fahnestock | 200—159 |

| | | | |
|---|---|---|---|
| 1,604,265 | 10/1826 | Dosbaugh | 200—159 |
| 2,507,381 | 5/1950 | Morse | 200—159 X |
| 2,954,447 | 9/1960 | Bolesky et al. | 200—138 |
| 3,014,105 | 12/1961 | Schmitt | 200—113 X |
| 3,073,934 | 1/1963 | Oakman et al. | 200—159 |

BERNARD A. GILHEANY, *Primary Examiner.*

R. COHRS, *Assistant Examiner.*

Disclaimer

Reissue No. 26,406.—*John D. Bolesky*, Mansfield Ohio. SNAP ACTING THERMAL DISC WITH BENT-OVER ANGULATED LEAF SPRING CONTACT MEMBER. Reissue patent dated June 11, 1968. Dedication filed Apr. 4, 1969, by the assignee, *Therm-O-Disc, Incorporated.*

Hereby dedicates to the Public the entire patent.

[*Official Gazette August 12, 1969.*]